(12) United States Patent
Du et al.

(10) Patent No.: US 11,083,004 B2
(45) Date of Patent: Aug. 3, 2021

(54) DATA TRANSMISSION METHOD AND APPARATUS

(71) Applicant: Huawei Technologies Co., Ltd., Shenzhen (CN)

(72) Inventors: Bai Du, Shanghai (CN); Peng Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/552,371

(22) Filed: Aug. 27, 2019

(65) Prior Publication Data

US 2019/0387538 A1 Dec. 19, 2019

Related U.S. Application Data

(63) Continuation of application No. PCT/CN2018/076295, filed on Feb. 11, 2018.

(30) Foreign Application Priority Data

Feb. 28, 2017 (CN) .......................... 201710114720.4

(51) Int. Cl.
*H04W 72/12* (2009.01)
*H04W 72/04* (2009.01)
*H04W 72/14* (2009.01)

(52) U.S. Cl.
CPC ... *H04W 72/1278* (2013.01); *H04W 72/0406* (2013.01); *H04W 72/0453* (2013.01);
(Continued)

(58) Field of Classification Search
CPC ......... H04W 72/1278; H04W 72/0406; H04W 72/0453; H04W 72/121; H04W 72/1268;
(Continued)

(56) References Cited

U.S. PATENT DOCUMENTS

2006/0291393 A1 12/2006 Teague et al.
2013/0051358 A1 2/2013 Turtinen et al.
(Continued)

FOREIGN PATENT DOCUMENTS

CN 101233779 A 7/2008
CN 104919878 A 9/2015
(Continued)

OTHER PUBLICATIONS

Institute for Information Industry (III), "On eMBB and URLLC multiplexing in uplink," 3GPP TSG-RAN WG1 Meeting #88, R1-1702295, Athens, Greece, Feb. 13-17, 2017, 6 pages.
(Continued)

*Primary Examiner* — Thai Nguyen
(74) *Attorney, Agent, or Firm* — Slater Matsil, LLP (57) ABSTRACT

Embodiments of this application disclose a data transmission method and apparatus, and relate to the field of wireless communications technologies. According to the embodiments of this application, a first terminal sends first information to a second terminal, where the first information is used to instruct the second terminal to stop using a first resource to send uplink data; and the first terminal uses the first resource to send uplink data.

9 Claims, 6 Drawing Sheets

(52) U.S. Cl.
CPC ..... *H04W 72/121* (2013.01); *H04W 72/1268* (2013.01); *H04W 72/14* (2013.01)

(58) Field of Classification Search
CPC ............. H04W 72/14; H04W 72/1242; H04W 72/0493
See application file for complete search history.

(56) References Cited

U.S. PATENT DOCUMENTS

| | | |
|---|---|---|
| 2015/0358133 A1 | 12/2015 | Kusashima et al. |
| 2016/0212594 A1* | 7/2016 | Morita .................... H04W 4/06 |
| 2016/0352551 A1 | 12/2016 | Zhang et al. |
| 2017/0006634 A1 | 1/2017 | Luo et al. |

FOREIGN PATENT DOCUMENTS

| | | |
|---|---|---|
| CN | 104955156 A | 9/2015 |
| CN | 105338635 A | 2/2016 |
| GB | 201700108 | 2/2017 |
| WO | 2018126934 A1 | 7/2018 |

OTHER PUBLICATIONS

Intel Corporation, "Uplink Multiplexing of eMBB and URLLC Transmissions," 3GPP TSG RAN WG1 NR Ad-Hoc Meeting, R1-1700377, Spokane, US, Jan. 16-20, 2017, 8 pages.

* cited by examiner

DATA TRANSMISSION METHOD AND APPARATUS

CROSS-REFERENCE TO RELATED APPLICATIONS

This application is a continuation of International Application No. PCT/CN2018/076295, filed on Feb. 11, 2018, which claims priority to Chinese Patent Application No. 201710114720.4, filed on Feb. 28, 2017. The disclosures of the aforementioned applications are hereby incorporated by reference in their entireties.

TECHNICAL FIELD

This application relates to the field of wireless communications technologies, and in particular, to a data transmission method and apparatus.

BACKGROUND

Currently, the International Telecommunication Union defines three types of 5G services: an enhanced mobile broadband (eMBB) service, an ultra-reliable and low-latency communications (URLLC) service, and a massive machine-type communications (mMTC) service. The URLLC service has a very high requirement for transmission latency. When reliability is not required, the URLLC service requires transmission latency to be within 0.5 ms. When reliability of 99.999% is required, the URLLC service still requires transmission latency to be within 1 ms. Therefore, data is transmitted at a shorter transmission interval, for example, a short transmission time interval (sTTI) or a mini-slot. Typical URLLC services include industrial control in the internet of things, automatic control in an unmanned vehicle, and the like. Typical eMBB services include an ultra high definition video, virtual reality (VR), augmented reality (AR), and the like.

However, because the eMBB service is transmitted at a relatively long TTI, when a URLLC terminal needs to transmit URLLC service data, if the URLLC terminal sends the URLLC service data to a base station after transmission of currently scheduled eMBB service data is completed, a transmission latency of the URLLC service is excessively long, and a requirement of the URLLC service for a transmission latency cannot be met. Therefore, to ensure that the transmission latency of the URLLC service falls within a target range, the URLLC terminal may transmit the URLLC service data directly by using an uplink resource that is being used to transmit the eMBB service data.

However, after the uplink resource that is being used to transmit the eMBB service data is used for the URLLC service data, the eMBB terminal continues sending the eMBB service data to the base station by using the uplink resource. Consequently, the eMBB terminal and the URLLC terminal simultaneously send data on a same resource, causing interference between the eMBB service and the URLLC service.

SUMMARY

Embodiments of this application provide a data transmission method and apparatus, to resolve a problem that uplink resource preemption causes interference between an eMBB service and a URLLC service.

To achieve the foregoing objective, the following technical solutions are used in the embodiments of this application.

According to a first aspect, an embodiment of this application provides a data transmission method. The method includes sending, by a first terminal, first information to a second terminal, where the first information is used to instruct the second terminal to stop using a first resource to send uplink data. The method also includes sending, by the first terminal, uplink data by using the first resource. It can be learned that, when the first terminal needs to use the first resource of the second terminal to send data, the first terminal instructs the second terminal in advance to stop using the first resource to send the uplink data, so that the first terminal and the second terminal do not simultaneously use a same uplink resource to send data, thereby resolving a problem of mutual interference between an eMBB service and a URLLC service.

In a possible design, before sending the first information to the second terminal, the first terminal may receive second information from the second terminal, where the second information includes information about a second resource used by the second terminal for uplink data transmission. It can be learned that, before sending the uplink data, the first terminal first obtains the second information of the second terminal, so that when the first terminal needs to send the uplink data, the first terminal determines, more conveniently and quickly based on the second resource, the first resource that needs to be preempted. In this way, a transmission latency of a service supported by the first terminal is reduced, and a second terminal corresponding to the first resource can be determined in a timely manner. In addition, the first terminal instructs the second terminal to stop using the first resource to send uplink data, thereby avoiding service interference between the first terminal and the second terminal.

In a possible design, the first terminal may send third information, where the third information is used to request to obtain the information about the second resource used by the second terminal for uplink data transmission.

In a possible design, the first terminal determines, based on the second resource, the first resource used by the first terminal for uplink data transmission, where the first resource is a part or a whole of the second resource. It can be learned that, the first terminal may directly determine, based on the second resource received in advance, the first resource used for uplink data transmission, instead of determining the first resource by exchanging information with the second terminal when the first terminal needs to execute a service. In this way, a time for determining the first resource is reduced, and a transmission latency of a service supported by the first terminal is reduced.

According to a second aspect, an embodiment of this application provides a data transmission method. The method includes receiving, by a second terminal, first information from a first terminal, where the first information is used to instruct the second terminal to stop using a first resource to send uplink data. The method also includes stopping, by the second terminal, using the first resource to send the uplink data. It can be learned that, if the second terminal stops using the first resource to send the uplink data, a base station does not simultaneously receive, on the first resource, data sent by the two terminals, thereby avoiding service interference between the two terminals.

In a possible design, before receiving the first information from the first terminal, the second terminal needs to send second information to the first terminal, where the second information includes information about a second resource used by the second terminal for uplink data transmission. The second terminal sends the information about the second resource used for uplink data transmission to the first terminal, so that when the first terminal needs to send uplink data, the first terminal directly determines the first resource based on the second resource, and notifies the second terminal that the first terminal needs to preempt the first resource, to reduce a transmission latency of a service supported by the first terminal, and avoid service interference between the first terminal and the second terminal.

In a possible design, the second terminal receives third information from the first terminal, where the third information is used to request to obtain the information about the second resource used by the second terminal for uplink data transmission.

In a possible design, the first terminal in the first aspect and the second aspect is an ultra-reliable and low-latency communications (URLLC) service terminal, and the second terminal in the first aspect and the second aspect is an enhanced mobile broadband (eMBB) service terminal.

According to a third aspect, an embodiment of this application provides a data transmission apparatus. The apparatus can implement a function performed by the first terminal in the foregoing first aspect. The function may be implemented by hardware, or may be implemented by hardware executing corresponding software. The hardware or the software includes one or more modules corresponding to the foregoing functions.

In a possible design, a structure of the apparatus includes a processor and a transceiver. The processor is configured to support the apparatus in performing a corresponding function in the foregoing method. The transceiver is configured to support the apparatus in communicating with another network element. The apparatus may further include a memory. The memory is configured to be coupled to the processor, and the memory stores a program instruction and data that are necessary for the apparatus.

According to a fourth aspect, an embodiment of this application provides a data transmission apparatus. The apparatus can implement a function performed by the second terminal in the foregoing second aspect. The function may be implemented by hardware, or may be implemented by hardware executing corresponding software. The hardware or the software includes one or more modules corresponding to the foregoing functions.

In a possible design, a structure of the apparatus includes a processor and a transceiver. The processor is configured to support the apparatus in performing a corresponding function in the foregoing method. The transceiver is configured to support the apparatus in communicating with another network element. The apparatus may further include a memory. The memory is configured to be coupled to the processor, and the memory stores a program instruction and data that are necessary for the apparatus.

According to a fifth aspect, an embodiment of this application provides a data transmission system, including a base station and the first terminal and the second terminal in the foregoing aspects.

According to a sixth aspect, an embodiment of this application provides a computer storage medium, configured to store a computer software instruction used by the foregoing first terminal. The computer storage medium includes a program designed for executing the foregoing aspects.

According to a seventh aspect, an embodiment of this application provides a computer storage medium, configured to store a computer software instruction used by the foregoing second terminal. The computer storage medium includes a program designed for executing the foregoing aspects.

In comparison with a current technology in which a URLLC terminal directly preempts a resource of an eMBB terminal when the URLLC terminal needs to execute a URLLC service, and consequently service interference is caused because the URLLC terminal and the eMBB terminal use a same uplink resource to send data, in the embodiments of this application, when the first terminal needs to use the first resource to send uplink data, the first terminal instructs the second terminal to stop using the first resource to send uplink data, so that the first terminal and the second terminal do not simultaneously use a same uplink resource to send data. The base station receives, on the first resource, only the uplink data sent by the first terminal. This not only reduces a service transmission latency of the first terminal, but also resolves a problem of mutual interference between an eMBB service and a URLLC service.

DETAILED DESCRIPTION OF ILLUSTRATIVE EMBODIMENTS

A system architecture and a service scenario described in this application aim to more clearly describe the technical solutions in this application, but are not intended to limit the technical solutions provided in this application. A person of ordinary skill in the art may know that as the system architecture evolves and a new service scenario emerges, the technical solutions provided in this application further apply to a similar technical problem.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "example" or "for example" or the like is intended to present a related concept in a specific manner.

It should be noted that in this application, "of", and "corresponding" may be interchangeably used sometimes. It should be noted that expressed meanings are consistent when differences are not emphasized.

A terminal in the embodiments of this application may be a mobile phone, a tablet computer, a computer with a wireless sending/receiving function, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application.

Figure 1:
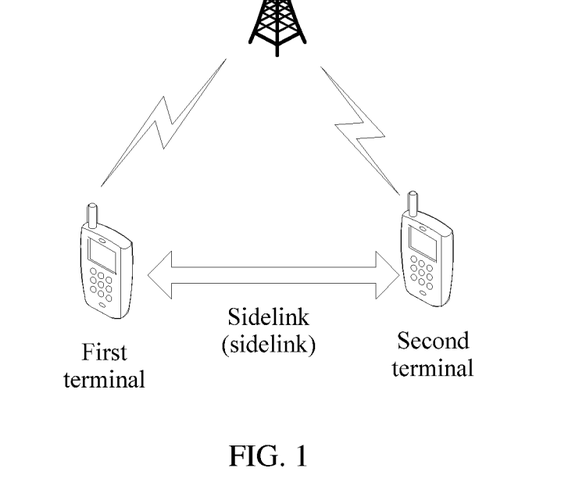
FIG. 1 is a schematic structural diagram of a communications system according to an embodiment of this application.

A data transmission method provided in the embodiments of this application is applied to a communications system. FIG. 1 shows a schematic architectural diagram of a system to which a data transmission method according to an embodiment of this application is applied. The communications system includes at least a base station, a first terminal, and a second terminal. The first terminal and the second terminal may communicate in a device-to-device (D2D) manner. When communication is performed in the D2D manner, a communication link between the terminals is referred to as a sidelink.

In this embodiment of this application, the first terminal may be a URLLC service terminal, and the second terminal may be an eMBB service terminal. However, this is not limited in this application.

The eMBB service terminal is a terminal that bears an eMBB service, and the URLLC service terminal is a terminal that bears a URLLC service. It should be noted that a same terminal may bear different services in different time periods. In this case, the terminal is referred to as an eMBB service terminal in a time period in which the terminal bears the eMBB service, and the terminal is referred to as a URLLC service terminal in a time period in which the terminal bears the URLLC service. Because the URLLC service has a relatively high requirement for a transmission latency, when the URLLC service terminal needs to execute the URLLC service, the URLLC service terminal directly exchanges data (for example, exchanges data by using the sidelink) with the eMBB service terminal, thereby transmitting URLLC service data by occupying an uplink resource that is being used to transmit eMBB service data.

Figure 2:
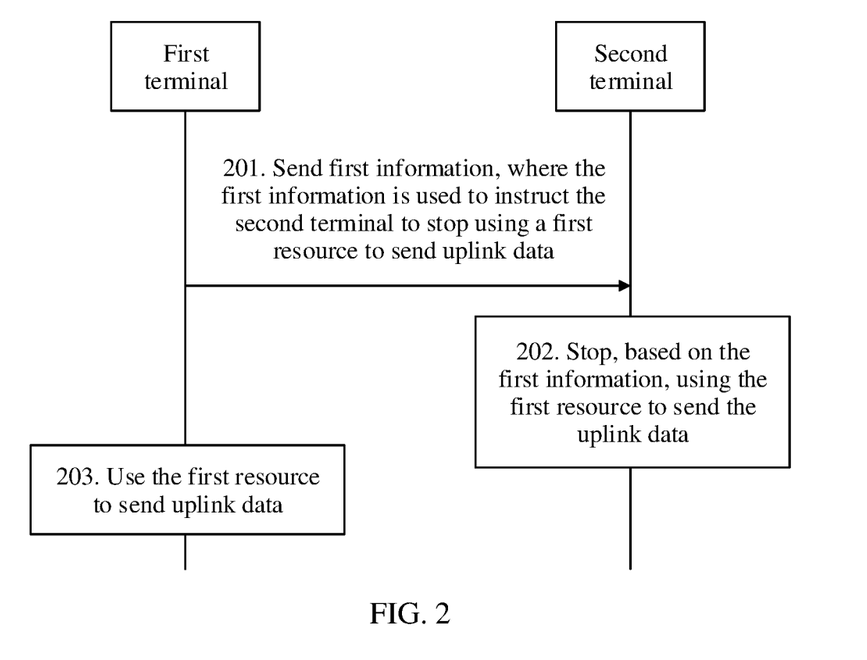
FIG. 2 is a flowchart of a data transmission method according to an embodiment of this application.

With reference to the communications system shown in FIG. 1, to avoid interference that is between an eMBB service and a URLLC service and is caused by resource preemption, an embodiment of this application provides a data transmission method. As shown in FIG. 2, the method includes the following steps.

201. A first terminal sends first information to a second terminal, where the first information is used to instruct the second terminal to stop using a first resource to send uplink data.

The first terminal and the second terminal are used to represent terminals that execute different services. A service executed by the first terminal has a relatively high requirement for a transmission latency, and an sTTI needs to be used to support the service of the first terminal. A service executed by the second terminal has a relatively long scheduling time, and has a relatively low requirement for a transmission latency. For example, a 1 ms TTI may be used.

In a possible implementation, that the first terminal is a URLLC service terminal and the second terminal is an eMBB service terminal is used as an example in this embodiment of this application. However, a type of the first terminal and a type of the second terminal are not limited in this application.

When the URLLC service terminal needs to execute a URLLC service, the URLLC service terminal may select a first resource from a second resource that is used by the eMBB service terminal for uplink data transmission. To prevent the eMBB service terminal from continuing using the first resource, the URLLC service terminal needs to send the first information to the eMBB service terminal.

The first resource may be all uplink resources used by the eMBB service terminal for uplink data transmission, or may be some uplink resources used by the eMBB service terminal for uplink data transmission. The URLLC service terminal may select a most suitable uplink resource as the first resource based on a service requirement. For example, the URLLC service terminal may select an uplink resource with best channel quality as the first resource. However, this application is not limited thereto. The first resource may be alternatively selected according to another principle.

Optionally, the first information may be used to instruct the second terminal to stop sending uplink data. For example, when receiving the first information, the second terminal stops currently transmitted uplink data. Alternatively, the first information includes a first time. When the second terminal receives the first information, if a time domain range of scheduled uplink transmission of the second terminal includes the first time, the second terminal stops sending uplink data that is transmitted after the first time in this transmission process.

It should be further noted that in this embodiment of this application, a communication process between the first terminal and the second terminal may be partially or completely performed by using a sidelink. However, a communication manner between the first terminal and the second terminal is not limited in this application.

202. The second terminal stops, based on the first information, using the first resource to send the uplink data.

203. The first terminal sends uplink data by using the first resource.

Figure 3:
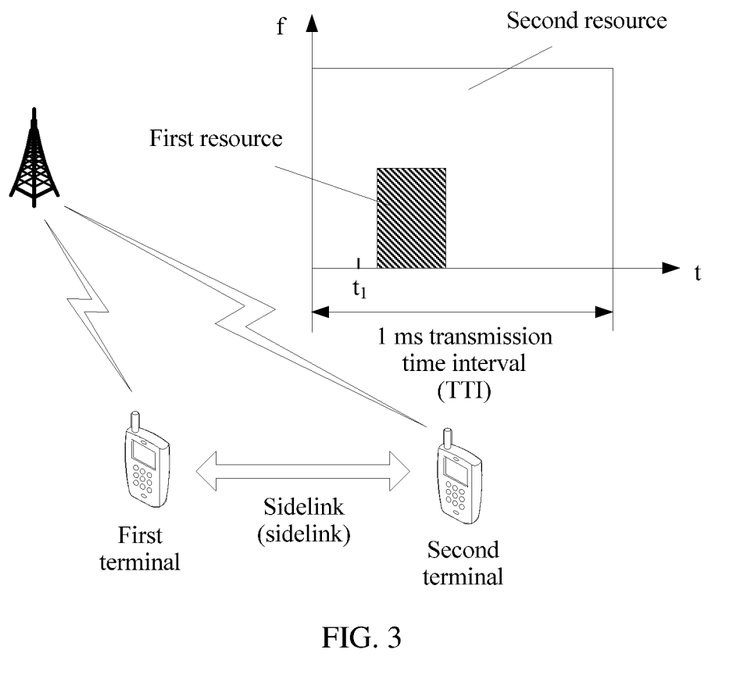
FIG. 3 is an example schematic diagram of a data transmission method according to an embodiment of this application.

For details, refer to FIG. 3. At a moment t1, the eMBB service terminal sends the uplink data to a base station by using a second resource shown in FIG. 3, and at this moment, the URLLC service terminal needs to execute the URLLC service. However, if the URLLC service terminal sends URLLC service data to the base station after the eMBB service terminal completes service data transmission, a requirement of the URLLC service for a transmission latency cannot be met; and if the URLLC service terminal directly preempts an eMBB service resource, the eMBB service terminal and the URLLC service terminal simultaneously use a same resource to send uplink data, and service interference is generated. To resolve these problems, when the URLLC service terminal needs to execute the URLLC service, the URLLC service terminal may instruct the eMBB service terminal to stop sending the uplink data on the first resource, and then the URLLC service terminal may use the first resource to send the uplink data to the base station. It can be learned from FIG. 3 that, in comparison with a case of executing the URLLC service after the eMBB service terminal completes sending of the uplink data by using the second resource, a transmission latency of the URLLC service can be reduced when the URLLC service terminal uses the first resource in the second resource to send the uplink data.

According to the data transmission method provided in this embodiment of this application, in comparison with a current technology in which the URLLC service terminal directly preempts a resource of the eMBB service terminal when the URLLC service terminal needs to execute the URLLC service, and consequently service interference is caused because the URLLC service terminal and the eMBB service terminal use a same uplink resource to send data, in this embodiment of this application, when the first terminal needs to use the first resource to send the uplink data, the first terminal instructs the second terminal to stop using the first resource to send the uplink data, so that the first terminal and the second terminal do not simultaneously use a same uplink resource to send data. The base station receives, on the first resource, only the uplink data sent by the first terminal. This not only reduces a service transmission latency of the first terminal, but also resolves a problem of mutual interference between the eMBB service and the URLLC service.

Figure 4:
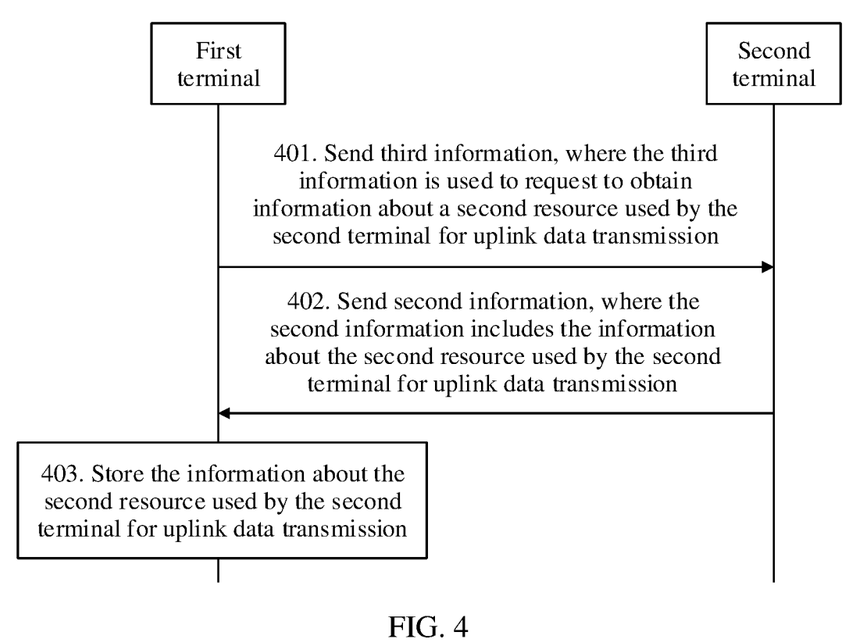
FIG. 4 is a flowchart of another data transmission method according to an embodiment of this application.

Before preempting an uplink resource of the second terminal to send the uplink data, the first terminal needs to first determine the first resource. To help the first terminal to quickly determine the first resource, the first terminal may learn in advance information about the second resource used by the second terminal for uplink data transmission. Based on this, in another implementation provided in this embodiment of this application, as shown in FIG. 4, before the method procedure shown in FIG. 2 is performed, the following steps may further be performed.

401. The first terminal sends third information, where the third information is used to request to obtain information about the second resource used by the second terminal for uplink data transmission.

The first terminal may send a detection signal, to find a surrounding second terminal. After receiving the detection signal, the second terminal returns a response message to the first terminal. Then, the first terminal sends the third information to the second terminal that returns the response message, to request to obtain information about a second resource used, for uplink data transmission, by the second terminal that returns the response message.

Alternatively, the third information is a broadcast message. The third information may be alternatively carried in the detection signal sent by the first terminal. After receiving the message that carries the third information, the second terminal directly returns the information about the second resource used by the second terminal for uplink data transmission.

In another possible implementation, the second terminal may send a detection signal. The first terminal may receive detection signals sent by a plurality of second terminals, and then separately send the third information to each second terminal, to learn information about second resources used by the surrounding second terminals for uplink data transmission.

402. The second terminal sends second information to the first terminal, where the second information includes the information about the second resource used by the second terminal for uplink data transmission.

The information about the second resource used by the second terminal for uplink data transmission may be location information of the second resource that is allocated by the base station to the second terminal and that is used for uplink data transmission.

The information that is about the second resource used by the second terminal for uplink data transmission and that is included in the second information may be information about all second resources used by the second terminal for uplink data transmission, or may be information about some second resources used by the second terminal for uplink data transmission.

It should be noted that the second terminal may return the second information to the first terminal after receiving the third information sent by the first terminal to the second terminal in step 401, or the second terminal may actively send the second information to a nearby first terminal. It may be understood that if the second terminal actively sends the second information to the first terminal, step 401 does not need to be performed.

403. The first terminal stores the information about the second resource used by the second terminal for uplink data transmission.

The first terminal may establish a second terminal resource group, and the second terminal resource group includes information that is about a second resource used by each second terminal for uplink data transmission and that is received by the first terminal. Because the second resource used by the second terminal for uplink data transmission may change, the first terminal further needs to maintain and update, in real time, the information about the second resource used by each second terminal for uplink data transmission in the second terminal resource group.

Figure 5:
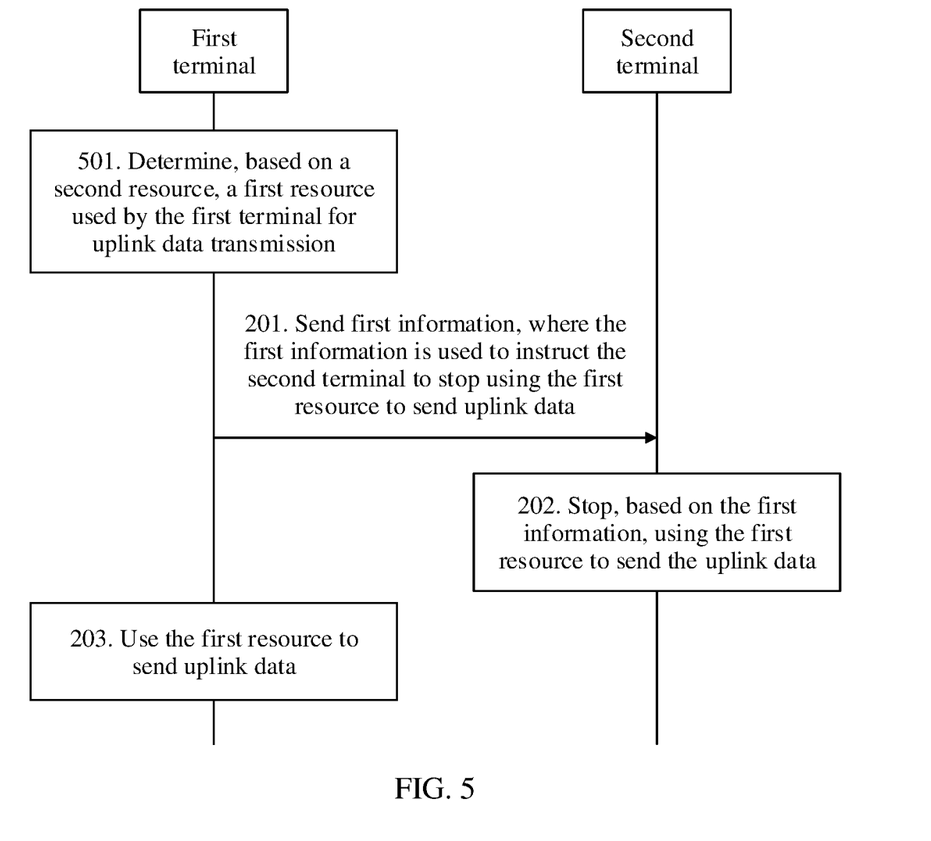
FIG. 5 is a flowchart of another data transmission method according to an embodiment of this application.

It may be understood that, after the first terminal stores the information about the second resource used by the second terminal for uplink data transmission, when the first terminal needs to transmit the uplink data, the first terminal may select the first resource from the information about the second resource used by the second terminal for uplink data transmission. Therefore, before step 201 is performed, step 501 may further be performed.

501. The first terminal determines, based on the second resource, the first resource used by the first terminal for uplink data transmission.

After the second terminal resource group is created, when the first terminal needs to send the uplink data, the first terminal may select a first resource from the second terminal resource group, then determine a second terminal to which the first resource belongs, and further send the first information to the second terminal to which the first resource belongs. Alternatively, when the first terminal needs to send the uplink data, the first terminal may select a second terminal from the second terminal resource group, then select a first resource from an uplink resource of the selected second terminal, and further send the first information to the selected second terminal, to instruct the second terminal to stop using the first resource to send uplink data.

It should be noted that, to minimize a quantity of affected second terminals, the first terminal may select a first resource from a second resource of a same second terminal in the second terminal resource group as far as possible. When a resource selected from one second terminal is insufficient, the first terminal may select a first resource from a plurality of second terminals in the second terminal resource group, and separately send the first information to each selected second terminal, to instruct the selected second terminal to stop using the first resource to send uplink data or stop sending uplink data.

In another implementation provided in this embodiment of this application, the base station may reserve some uplink resources for the first terminal. When the first terminal does not select a first resource from the second terminal resource group or a selected first resource is insufficient, the first terminal may use the selected first resource and the reserved resource to send the uplink data, or when a selected first resource is insufficient, the first terminal may not use the first resource, and directly use the reserved resource to send the uplink data.

Specifically, the base station may reserve some uplink resources for the URLLC service terminal. If there is no eMBB service terminal around the URLLC service terminal or no uplink resource is allocated to any eMBB service terminal around the URLLC service terminal, there is no information about the second resource in an eMBB service terminal resource group, and consequently, no first resource can be selected by the URLLC service terminal. Alternatively, when there is no enough second resource in an eMBB service terminal resource group, the URLLC service terminal cannot select enough first resources. To ensure smooth execution of the URLLC service, when the URLLC service terminal selects no first resource from the eMBB service terminal resource group or does not select enough first resources from the eMBB service terminal resource group, the URLLC service terminal may directly use a reserved resource to send the uplink data; or when the URLLC service terminal does not select enough first resources from the eMBB service terminal resource group, the URLLC service terminal may use a selected first resource and a reserved resource to send the uplink data.

In addition, the reserved resource is idle when the URLLC service terminal does not execute the URLLC service, or not all reserved resources are occupied when the URLLC service terminal executes a service. Therefore, when there is an idle reserved resource and there is an eMBB service terminal with insufficient uplink resources in the eMBB service terminal resource group, the base station may allocate the reserved resource to the eMBB service terminal with insufficient resources for use, or when there is an idle reserved resource, the base station may directly allocate the idle reserved resource to an eMBB service terminal in the eMBB service terminal resource group for use.

It should be noted that, if a reserved resource is allocated by the base station to the eMBB service terminal for use, when the URLLC service terminal needs to use the reserved resource, the URLLC service terminal needs to send the first information to the eMBB service terminal using the reserved resource, to instruct the eMBB service terminal to stop using the reserved resource to send uplink data, thereby avoiding service interference.

According to the data transmission method provided in this embodiment of this application, in comparison with a current technology in which the URLLC service terminal directly preempts a resource of the eMBB service terminal when the URLLC service terminal needs to execute the URLLC service, and consequently service interference is caused because the URLLC service terminal and the eMBB service terminal use a same uplink resource to send data, in this embodiment of this application, when the URLLC service terminal needs to execute the URLLC service, the URLLC service terminal first sends a preemption instruction to an eMBB service terminal whose resource is preempted, to instruct the eMBB service terminal whose resource is preempted to stop using the preempted eMBB service resource to send the uplink data. In this way, the base station receives, on the preempted eMBB service resource, only the uplink data sent by the URLLC service terminal. This not only reduces a service transmission latency of the URLLC service, but also resolves a problem of mutual interference between the eMBB service and the URLLC service.

The foregoing mainly describes the solutions provided in the embodiments of this application from a perspective of the first terminal and a perspective of the second terminal. It may be understood that the first terminal and the second terminal each include a corresponding hardware structure and/or software module for implementing each function. A person skilled in the art should easily be aware that in combination with the examples described in the embodiments disclosed in this specification, units and algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first terminal and the second terminal may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that in the embodiments of this application, module division is an example, and is merely a logical function division. In actual implementation, another division manner may be used.

Figure 6:
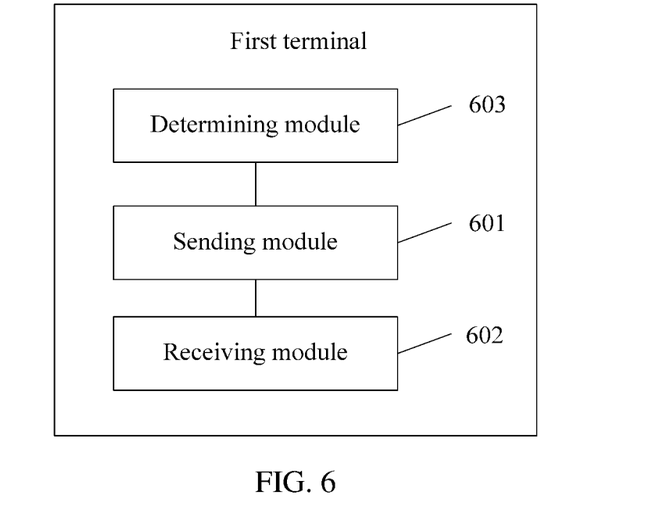
FIG. 6 is a schematic diagram of a logical structure of a first terminal according to an embodiment of this application.

An embodiment of this application further provides a data transmission apparatus, and the apparatus may be the first terminal in the foregoing embodiment. FIG. 6 is a possible schematic structural diagram of the first terminal in the foregoing embodiment. The first terminal includes a sending module 601, a receiving module 602, and a determining module 603. The sending module 601 is configured to support the first terminal in performing steps 201 and 203 in FIG. 2 and step 401 in FIG. 4. The receiving module 602 is configured to support the first terminal in receiving second information sent by a second terminal. The determining module 603 is configured to support the first terminal in performing step 501 in FIG. 5. All related content of the steps in the foregoing method embodiment may be referenced in a function description of a corresponding function module, and details are not described herein again.

Figure 7:
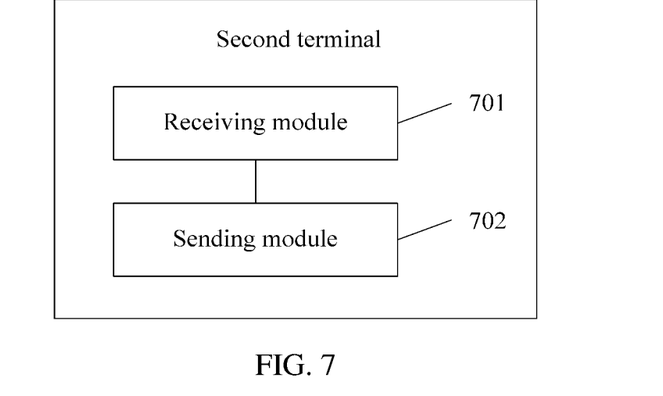
FIG. 7 is a schematic diagram of a logical structure of a second terminal according to an embodiment of this application.

An embodiment of this application further provides another data transmission apparatus, and the apparatus may be the second terminal in the foregoing embodiment. FIG. 7 shows a possible schematic structural diagram of the second terminal in the foregoing embodiment. The second terminal includes a receiving module 701 and a sending module 702. The receiving module 701 is configured to support the second terminal in receiving first information and third information from a first terminal, and the sending module 702 is configured to support the second terminal in performing step 402 in FIG. 4. All related content of the steps in the foregoing method embodiment may be referenced in a function description of a corresponding function module, and details are not described herein again.

Figure 8:
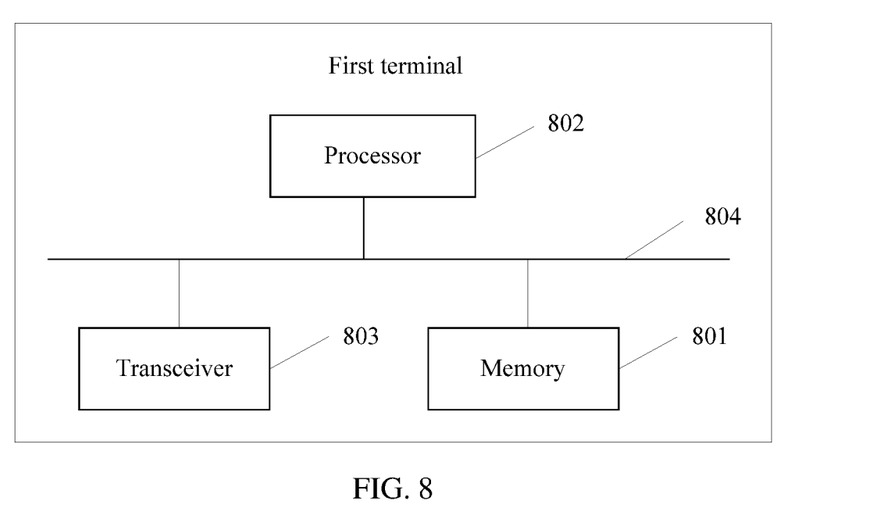
FIG. 8 is a schematic diagram of a logical structure of another first terminal according to an embodiment of this application.

FIG. 8 is another possible schematic structural diagram of the first terminal in the foregoing embodiment. As shown in FIG. 8, the first terminal includes: a processor 801, a transceiver 803, a memory 801, and a bus 804. The transceiver 803, the processor 802, and the memory 801 are interconnected by using the bus 804. The bus 804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 8, but this does not mean that there is only one bus or only one type of bus.

The memory 801 is configured to store program code and data of the first terminal. The transceiver 803 is configured to support communication between the first terminal and another network entity. For example, the transceiver 803 is configured to support the first terminal in performing step 201 and step 203 in FIG. 2 and step 401 in FIG. 4. The processor 802 is configured to control an action of the first terminal. For example, the processor 802 is configured to support the first terminal in performing step 501 in FIG. 5, and/or is configured to perform another process of a technology described in this specification.

Figure 9:
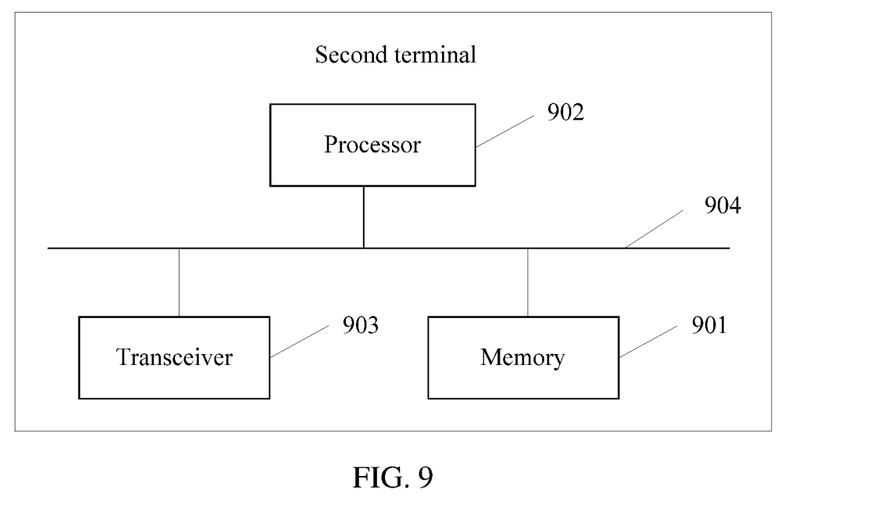
FIG. 9 is a schematic diagram of a logical structure of another second terminal according to an embodiment of this application.

FIG. 9 is another possible schematic structural diagram of the second terminal in the foregoing embodiment. As shown in FIG. 9, the second terminal includes: a processor 902, a transceiver 903, a memory 901, and a bus 904. The transceiver 903, the processor 902, and the memory 901 are interconnected by using the bus 904. The bus 904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 9, but this does not mean that there is only one bus or only one type of bus.

The memory 901 is configured to store program code and data of the second terminal. The transceiver 903 is configured to support communication between the second terminal and another network entity. For example, the transceiver 903 is configured to support the second terminal in performing step 402 in FIG. 4. The processor 902 is configured to control an action of the second terminal. For example, the processor 902 is configured to support the second terminal in performing step 202 in FIG. 2, and/or is configured to perform another process of a technology described in this specification.

Method or algorithm steps described in combination with the content disclosed in this application may be implemented by hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

Based on the foregoing descriptions of the implementations, a person skilled in the art may clearly understand that this application may be implemented by software in addition to necessary universal hardware or by hardware only. In most circumstances, the former is a better implementation. Based on such an understanding, the technical solutions of this application essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in the embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
sending, by a first terminal to a second terminal, third information, wherein the third information requests to obtain information about a second resource to be used by the second terminal for uplink data transmission to a base station;
determining, by the first terminal based on the second resource, a first resource to be used by the first terminal for uplink data transmission, wherein the first resource is only a part of the second resource;
sending, by the first terminal, first information to the second terminal, wherein the first information instructs the second terminal to stop using the first resource to send uplink data; and
sending, by the first terminal, uplink data using the first resource; and
wherein the first terminal is an ultra-reliable and low-latency communications (URLLC) service terminal, and the second terminal is an enhanced mobile broadband (eMBB) service terminal.

2. The method according to claim 1, wherein before sending, by the first terminal, the first information to the second terminal, the method further comprises:
receiving, by the first terminal, second information from the second terminal, wherein the second information comprises information about the second resource to be used by the second terminal for uplink data transmission.

3. The method according to claim 1, wherein sending, by the first terminal to the second terminal, the third information comprises:
sending, by the first terminal, a detection signal for discovering the second terminal, the detection signal comprising the third information.

4. The method according to claim 1, wherein sending, by the first terminal to the second terminal, the third information comprises:
receiving, by the first terminal, a detection signal from the second terminal; and
in response to receiving the detection signal, sending the third information to the second terminal.

5. A method, comprising:
establishing, by a second terminal, a sidelink connection with a first terminal;
receiving, by the second terminal, third information from the first terminal, wherein the third information requests to obtain information about a second resource used by the second terminal for uplink data transmission to a base station;
receiving, by the second terminal, first information from the first terminal using the sidelink connection, wherein the first information instructs the second terminal to stop using a first resource to send uplink data, the first resource is to be used by the first terminal for uplink data transmission, and the first resource is only a part of the second resource; and
stopping, by the second terminal, using the first resource to send the uplink data; and
wherein the first terminal is an ultra-reliable and low-latency communications (URLLC) service terminal, and the second terminal is an enhanced mobile broadband (eMBB) service terminal.

6. The method according to claim 5, wherein before receiving, by the second terminal, the first information from the first terminal, the method further comprises:
sending, by the second terminal, second information to the first terminal, wherein the second information comprises information about the second resource used by the second terminal for uplink data transmission to the base station.

7. An apparatus, comprising:
a processor; and
a non-transitory computer readable medium storing a program to be executed by the processor, the program including instructions for:
establishing a sidelink connection to a second terminal;
sending, to the second terminal, third information, wherein the third information requests to obtain information about a second resource to be used by the second terminal for uplink data transmission to a base station;
determining, based on the second resource, a first resource to be used for uplink data transmission, wherein the first resource is only a part of the second resource;
determining first information, wherein the first information instructs the second terminal to stop using the first resource to send uplink data;
sending the first information to the second terminal using the sidelink connection; and
sending uplink data to the base station using the first resource; and
wherein the apparatus is an ultra-reliable and low-latency communications (URLLC) service terminal, and the second terminal is an enhanced mobile broadband (eMBB) service terminal.

8. The apparatus according to claim 7, wherein the program further includes instructions for:
receiving second information from the second terminal, wherein the second information comprises information about the second resource to be used by the second terminal for uplink data transmission.

9. The apparatus according to claim 8, wherein the program further includes instructions for:
determining, based on the second resource, the first resource used for uplink data transmission, wherein the first resource is a part or a whole of the second resource.

* * * * *